(12) United States Patent
Masui

(10) Patent No.: US 7,164,637 B2
(45) Date of Patent: Jan. 16, 2007

(54) INFORMATION RECORDING METHOD AND INFORMATION RECORDING APPARATUS

(75) Inventor: Naruhiro Masui, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 179 days.

(21) Appl. No.: 10/938,945

(22) Filed: Sep. 13, 2004

(65) Prior Publication Data
US 2005/0041548 A1    Feb. 24, 2005

Related U.S. Application Data
(63) Continuation of application No. PCT/JP04/02828, filed on Mar. 5, 2004.

Foreign Application Priority Data
Jun. 13, 2003    (JP)    ............... 2003-168615

(51) Int. Cl.
G11B 7/00    (2006.01)

(52) U.S. Cl. ................................. 369/47.53

(58) Field of Classification Search ................ 369/116, 369/47.27, 53.13, 47.5, 47.51, 47.52, 47.53
See application file for complete search history.

(56) References Cited

U.S. PATENT DOCUMENTS
6,243,339 B1 * 6/2001 Spruit et al. ............. 369/53.13

FOREIGN PATENT DOCUMENTS
JP    8-203080    8/1996

* cited by examiner

*Primary Examiner*—Nabil Hindi
(74) *Attorney, Agent, or Firm*—Dickstein Shapiro LLP

(57) ABSTRACT

In a method of transforming a recording power level into multi-levels by using an extra recording power level, the optimum value of each recording power level is obtained, thereby achieving recording with good accuracy. By including a first test writing step (S1–S3) of performing test writing of predetermined first test data while varying the recording power in stages, and calculating an optimum recording power from the reproduction signal, and a second test writing step (S4–S6) of setting the recording power to the calculated optimum recording power and performing test writing of predetermined second test data while varying in stages the extra recording power applied in a part of a time period in which the optimum recording power is applied, and calculating an optimum extra recording power from the reproduction signal, the recording power and the extra recording power are separately calculated by test writing, and with which information is recorded. Hence, it is possible to form the shape of a recording mark and the mark position with good accuracy. Thus, recording can be performed with good accuracy.

15 Claims, 8 Drawing Sheets

FIG.8
(a) WCK 
(b) Wdata 
(c) OPTICAL WAVEFORM 1 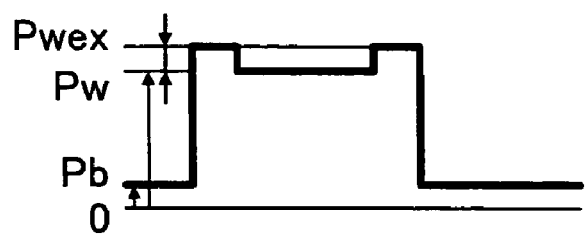
(d) OPTICAL WAVEFORM 2 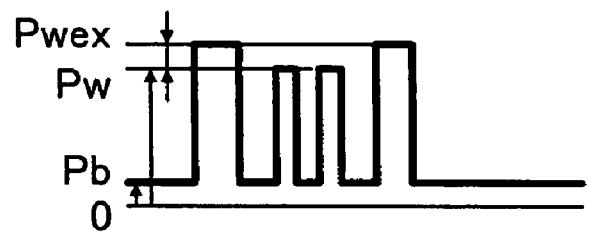
(e) OPTICAL WAVEFORM 3 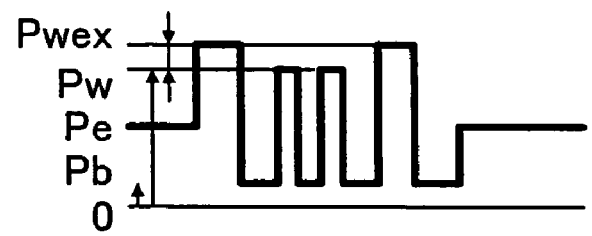

INFORMATION RECORDING METHOD AND INFORMATION RECORDING APPARATUS

CROSS-REFERENCE TO RELATED APPLICATION

This application is a U.S. continuation application, filed under 35 USC 111(a) and claiming the benefit under 35 USC 120 and 365(c), of PCT application PCT/JP2004/002828, filed on Mar. 5, 2004, which claims priority to Application Ser. No. 2003-168615, filed in Japan on Jun. 13, 2003. The foregoing applications are hereby incorporated herein by reference.

BACKGROUND OF THE INVENTION

1. Field of the Invention

The present invention relates to information recording methods and information recording apparatuses with respect to various recording media such as CD-Rs, CD-RWs, DVD-Rs, DVD-RWs, DVD-RAMs and DVD+RWs.

2. Description of the Related Art

Recently, optical disk drives capable of recording, such as CD-R drives, have come into practical use, and studies have been conducted in order to further increase the capacity and recording speed. Recordable optical disk media include: recordable optical disks using, for example, a dye medium; and rewritable disks using, for example, a magnetic optical medium or a phase change medium.

A general optical disk recording apparatus includes a semiconductor laser as a light source and emits on a recording medium a laser beam subjected to pulse-modulation by recording information, thereby forming a recording mark. On this occasion, the forming state of a recording mark varies depending on the power of the recording laser beam. Hence, conventionally, in order to obtain a recording power suitable for the characteristics of a recording medium, the so-called OPC (Optimum Power Control) method has been used in which test writing is previously performed on a predetermined area (PCA: Power Calibration Area) while varying the recording power as preparation for starting recording, and after the test writing, the power used for recording an area where a reproduction signal of the best quality is obtained is selected as the optimum recording power. When actually recording data, recording is performed while maintaining the optimum recording power thus obtained.

As for quality evaluation methods of the reproduction signal, several methods have been proposed, and the following method has been in practical use as a typical method.

First, there is a method (hereinafter appropriately referred to as "the β method") that makes evaluation from asymmetry β of the reproduction signal. That is, as shown in FIG. 6, a positive peak value A (=Ipk−Idc) and a negative peak value B (=Idc−Ibt) with respect to the DC level of the reproduction signal are detected, and the asymmetry β is calculated by $$\beta=((Ipk-Idc)-(Idc-Ibt))/(Ipk-Ibt).$$

The reproduction signal having the asymmetry β of a predetermined value (for example, 0) is considered to be good.

Second, there is a method (hereinafter appropriately referred to as "the γ method") that makes evaluation by using a degree of modulation m of the reproduction signal. First, as shown in FIG. 6, a maximum value Ipk and a minimum value Ibt of the reproduction signal are detected, and the degree of modulation m is calculated by $$m=(Ipk-Ibt)/Ipk.$$

Next, based on the calculated degree of modulation m and recording power P then, a rate of change γ of the degree of modulation m with respect to recording power P is calculated by $$\gamma=(dm/dP)(P/m)$$

Then, recording power Pt with which the rate of change γ becomes a predetermined value γt is obtained, and an optimum recording power is determined by multiplying the recording power Pt by a predetermined coefficient k.

On the other hand, recording methods of optical disks such as CDs and DVDs adopt a mark edge recording method in which the length of a mark represents information, which method is suitable for achieving high density recording. In order to accurately reproduce data, it is necessary to accurately control the shape of the mark and the position of the edge. Further, in order to make uniform the shapes of the marks even if the lengths of marks are different, the multi-pulse recording method, which forms a recording mark with a pulse sequence including plural recording pulses, is widely used. That is, uniform mark shapes are formed by forming marks by repeating the cycle of heating and cooling and coupling the marks. This method is also used in recordable media of the dye system type.

Incidentally, with the recent demand for high-speed recording and large capacity storage, various recording methods have been proposed. One of the methods is making recording power to have multiple levels.

For example, in CDs, the pulse of an extra recording power Pwex is added to the front edge of a recording pulse as shown in FIG. 4(C), thereby correcting irregularity of mark shapes caused by insufficient thermal storage effect in a recording medium immediately after application of recording power (see FIG. 4(d)).

In addition, as shown in FIG. 8(c), an extra recording pulse of the extra recording power Pwex may be added to the rear edge as well as the front edge. Further, as shown in FIG. 8(d) and (e), the extra recording power Pwex may be added to the recording power of a specific pulse (e.g., the front pulse or the last pulse) of multiple pulses. These methods are also applied for recording mark edge position control or recording mark shape control.

Thus, in such multi-level recording methods, of course, accurate shapes and positions of marks cannot be formed if the extra recording power Pwex as well as recording power Pw are not appropriate values with respect to a recording medium.

Hence, in order to improve compatibility between a recording medium and a recording apparatus, it is preferable to perform the OPC as mentioned above. However, conventionally, an optimum recording power Pw is obtained by performing test writing while maintaining a predetermined proportional relationship between the extra recording power Pwex and the recording power Pw (Pwex/Pw=constant), or while varying the recording power Pw and maintaining the extra recording power Pwex to be a predetermined value (Pwex=constant).

With such OPC methods, however, in a case where there is variation in a recording medium or a recording apparatus (that is, variation in a recording pulse waveform due to variation in a LD driver), the relationship between the recording power Pw and the extra recording power Pwex is not maintained to be constant, and the extra recording power Pwex calculated in the aforementioned manner is not an appropriate value. Accordingly, the accuracies of the mark shape and the mark position are degraded, which causes a data error. In addition, even in the same recording medium, if the recording speed is different, then the relationship between the appropriate recording power Pw and the extra recording power Pwex is different.

SUMMARY OF THE INVENTION

A general object of the present invention is to provide an information recording method and an information recording apparatus that transform a recording power level into multi-levels by using an extra recording power level and can perform recording with good accuracy by obtaining an optimum value for each recording power.

In order to achieve the above-mentioned object, according to one aspect of the present invention, there is provided an information recording method that records information by forming recording marks by guiding from a light source to a recording medium an optical beam modulated based on recording information, the information recording method comprising:

a first test writing step of performing test writing of predetermined first test data on a test writing area of the recording medium while varying an applied recording power in stages, and calculating an optimum recording power from a reproduction signal of the test-written first test data; and a second test writing step of setting the recording power to the optimum recording power and performing test writing of predetermined second test data on the test writing area of the recording medium while varying in stages an extra recording power applied in a part of a time period in which the optimum recording power is applied, and calculating an optimum extra recording power from a reproduction signal of the test-written second test data, wherein information is recorded by using the calculated optimum recording power and the calculated optimum extra recording power.

Accordingly, information is recorded by separately calculating the recording power and the extra recording power by test writing. Hence, it is possible to form the shape of a recording mark and the mark position with good accuracy. Thus, recording can be performed with good accuracy.

According to another aspect of the present invention, in the above-mentioned information recording method, the predetermined first test data may be a data string of the recording information other than a predetermined specific pattern.

Accordingly, since the first test data are a data string not including the specific pattern, it is possible to reduce variation in the average value level of the reproduction signal due to the extra recording power not being optimized at the time of the first test writing. Thus, it is possible to calculate the optimum recording power with good accuracy.

According to another aspect of the present invention, in the above-mentioned information recording method, the predetermined second test data may be a data string including a first data string and a second data string in an alternating manner, the first data string being formed by the first test data, and a predetermined specific pattern being repeated in the second data string.

Accordingly, since it is possible to separately detect the average value of the reproduction signal of each data string easily and with good accuracy, the accuracy of calculation of the optimum extra recording power is improved.

According to another aspect of the present invention, in the above-mentioned information recording method, the optimum recording power in the first test writing step may be calculated from one of a degree of modulation of the reproduction signal of the area subjected to the test writing of the first test data and a rate of change of the degree of modulation, and the optimum extra recording power in the second test writing step may be calculated from asymmetry of the reproduction signal of the area subjected to the test writing of the second test data.

It should be noted that in this present invention and the following inventions, asymmetry refers to the ratio of a positive peak value and a negative peak value with respect to the average value level of the reproduction signal.

Accordingly, it is possible to calculate the optimum recording power and the optimum extra recording power with good accuracy in accordance with each test data or recording medium.

According to another aspect of the present invention, in the above-mentioned information recording method, the optimum extra recording power in the second test writing step may be calculated from a ratio of a positive peak value and a negative peak value of the reproduction signal of the first data string with respect to an average value level of the reproduction signal of the second data string of the area subjected to the test writing of the second test data.

Accordingly, it is possible to calculate the optimum recording power and the optimum extra recording power with good accuracy in accordance with each test data or recording medium.

According to another aspect of the present invention, in the above-mentioned information recording method, the predetermined specific pattern may be a minimum mark length of the recording information.

Accordingly, since the minimum mark length having a great sensitivity of variation in the average value of the reproduction signal with respect to the extra recording power is repeated, it is possible to calculate the optimum extra recording power easily and with good accuracy.

According to other aspects of the present invention, it is possible to similarly obtain the effects obtained by the above-mentioned information recording methods with the information recording apparatus.

According to the inventions claimed in claims 1 and 7, information is recorded by separately calculating the recording power and the extra recording power by test writing. Hence, it is possible to form the shape of a recording mark and the mark position with good accuracy. Thus, recording can be performed with good accuracy.

According to one aspect of the present invention, since the first test data are a data string not including the specific pattern, it is possible to reduce variation in the average value level of the reproduction signal due to the extra recording power not being optimized at the time of the first test writing. Thus, it is possible to calculate the optimum recording power with good accuracy.

According to one aspect of the present invention, it is possible to separately detect the average value of the reproduction signal of each data string easily and with good accuracy, and the accuracy of calculation of the optimum extra recording power can be improved.

According to one aspect of the present invention, in the above-mentioned inventions, it is possible to calculate the optimum recording power and the optimum extra recording power with good accuracy in accordance with each test data or recording medium.

According to one aspect of the present invention, in the above-mentioned inventions, it is possible to calculate the optimum recording power and the optimum extra recording power with good accuracy in accordance with each test data or recording medium.

According to one aspect of the present invention, since the minimum mark length having a great sensitivity of variation in the average value of the reproduction signal with respect to the extra recording power is repeated, it is possible to calculate the optimum extra recording power easily and with good accuracy.

BRIEF DESCRIPTION OF THE DRAWINGS

FIG. 8 is a waveform chart showing applicable variations of the emission waveform.

DETAILED DESCRIPTION OF THE PREFERRED EMBODIMENTS

Figure 1:
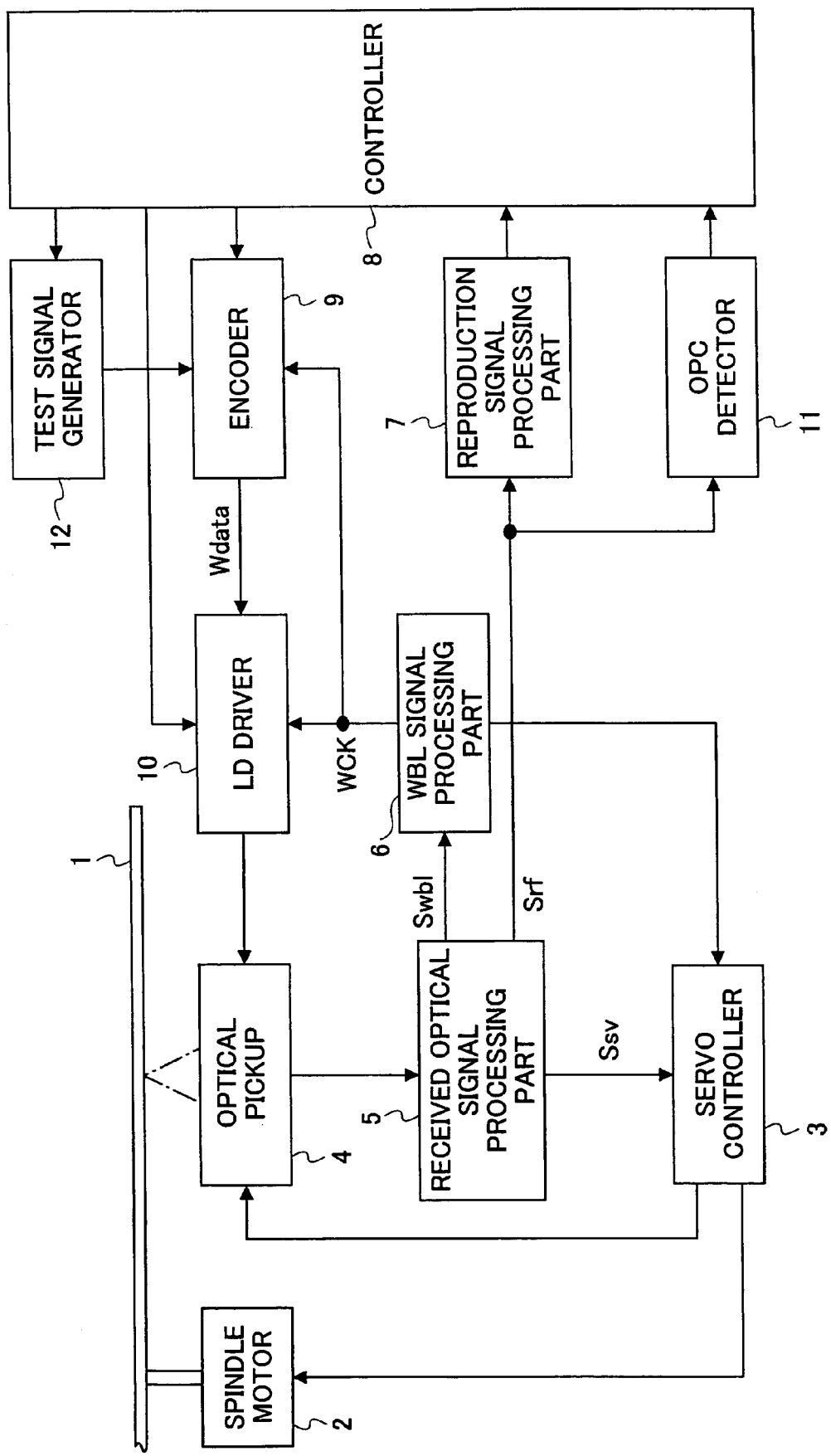
FIG. 1 is a block diagram showing a general structure of an optical information recording apparatus according to one embodiment of the present invention.

A description is given of one embodiment of the present invention with reference to the drawings. An information recording apparatus according to this embodiment is applied to an optical information recording apparatus. FIG. 1 is a block diagram showing a general structure of the optical information recording apparatus.

A recording medium 1 used in the optical information recording apparatus is a recordable recording medium (for example, an optical disk such as a CD-R, a CD-RW, a DVD-R, a DVD-RW, a DVD+R, a DVD+RW, a DVD-RAM, a MD and a MO). A spindle motor 2 that rotates the recording medium 1 is controlled to be at a constant linear velocity (CLV) or a constant angular velocity (CAV) in accordance with a signal supplied from a servo controller 3. An optical pickup (PU) 4 guides an emitted light beam from a laser diode (LD), which is a light source, to the recording medium 1 so as to record information, and receives a reflected light beam from the recording medium 1 to perform conversion into a received optical signal. The optical pickup 4 is formed by, for example, a photo acceptance unit that receives the light beam from the light source and the reflected light beam and converts them into received optical signals, an optical system, and an actuator. In addition, the optical pickup 4 is provided with a monitor that monitors a part of the emitted light beam from the light source. Variation in the amount of emitted light of the light source is controlled by a monitor signal, which is an output from the monitor. Further, the optical pickup 4 may be provided with a tilt detector for detecting the inclination (tilt) with respect to the light beam guided onto the recording medium 1.

A received optical signal processing part 5 receives signals from the various units provided in the optical pickup 4 and performs various signal processing tasks: generation of a reproduction signal Srf from the signals, and control (focus servo control and track servo control), together with the servo controller 3, of the actuator such that light is guided within a predetermined range of error against variations such as surface vibrations of the recording medium 1 due to rotation or vibrations in radial directions of the tracks. Thus, a servo error signal Ssv is generated from the signal and supplied to the servo controller 3. The optical pickup 4 is movable in radial directions of the recording medium 1, and performs a seek operation such that an optical spot is formed at a desired position. The servo controller 3 also includes functions of seek control, rotation control of the recording medium 1, and tilt control in accordance with address information recorded on the recording medium 1 in advance.

Wobbles, which are recording tracks meandering at a predetermined frequency, are formed on the recording medium 1 in advance. The received optical signal processing part 5 extracts a wobble component and generates a wobble signal Swbl. Based on the wobble signal Swbl, a wobble signal processing part 6 performs rotation control, detection of address information, and generation of a recording clock WCK, which serves as a reference clock at the time of recording.

A reproduction signal processing part 7 performs demodulation from the reproduction signal Srf in accordance with a predetermined modulation method of the recording medium 1 that is being reproduced. In addition, the reproduction signal processing part 7 extracts a reproduction clock by a PLL circuit incorporated therein. Demodulated data are supplied to a controller 8.

An encoder 9 performs modulation on recording information supplied from the controller 8 in accordance with a predetermined modulation method, and supplies recording data Wdata, which are generated on the basis of the recording clock WCK. In a DVD recording apparatus, for example, the EFM+ modulation method is used, and the pulse length of the recording data Wdata is 3T–11T or 14T (T: the cycle of the recording clock WCK).

A LD driver 10 modulates the light source LD by a predetermined optical waveform in accordance with the recording data Wdata and the recording clock WCK. Irradiation power and optical waveform information, for example, are set by the controller 8. In addition, the LD driver 10 receives a monitor signal from the received optical signal processing part 5, and based on the monitor signal, controls the amount of emitted light of the light source LD to be a desired value (performs so-called APC (Automatic Power Control)).

Figure 2:
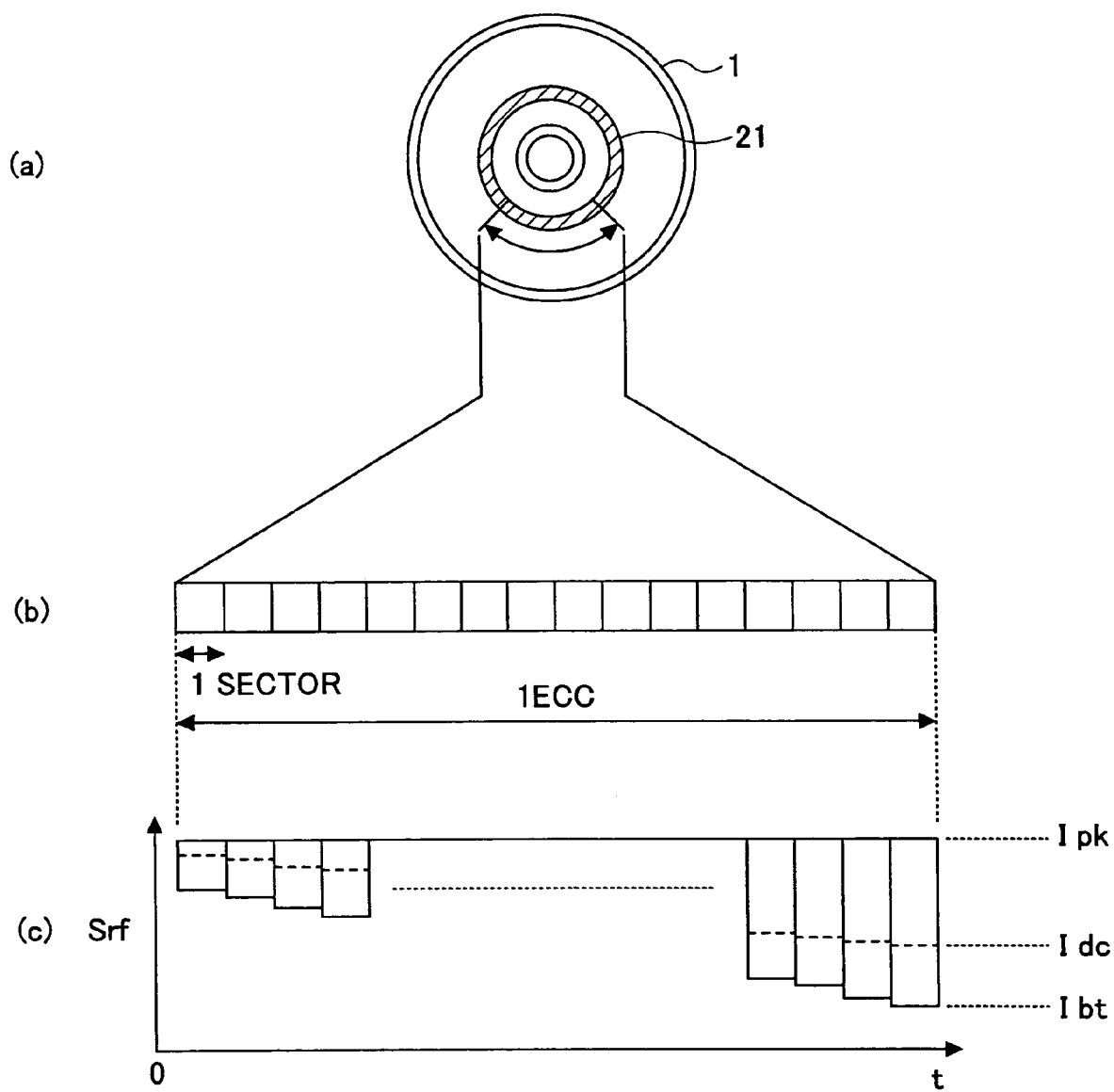
FIG. 2 is an explanatory diagram related to a PCA area and a test writing method.

Here, as shown in FIG. 2(a), the recording medium 1 is provided with a PCA (Power Calibration Area=test writing area) 21 in a predetermined area (for example, the innermost track portion), and the OPC (Optimum Power Control) is performed in which an optimum recording power is obtained by performing test writing on the PCA 21 before starting actual recording, and at the time of actual recording, recording is performed with the obtained recording power. In addition, as shown in FIG. 2(b), test writing is performed by using, for example, 1 ECC block (1 ECC block consists of 16 sectors), which is the information recording unit, and by varying the recording power for each sector.

Figure 3:
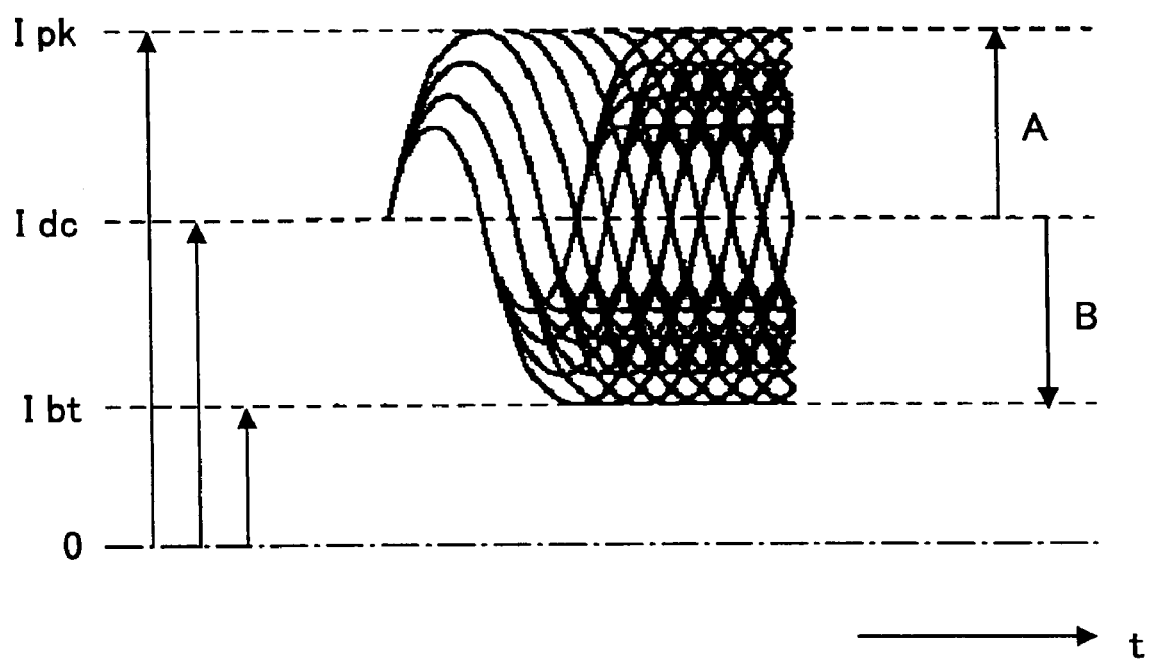
FIG. 3 is an eye diagram showing the characteristics of a reproduction signal.

As a result, the reproduction signal Srf of the test-written region becomes as shown in FIG. 2(c). Thus, an OPC detector 11 detects a maximum value Ipk, a minimum value Ibt, and an average value (DC value) Idc of the reproduction signal Srf of each sector. FIG. 3 is an eye diagram of the reproduction signal Srf. The controller 8 detects the above-mentioned values by reproducing the test-written area, and calculates an optimum recording power by performing predetermined calculations based on the values. The details of this calculation operation are described later.

When performing test writing, a test signal generator 12 generates test writing data (a test pattern). The test writing data are supplied to the encoder 9, and at the time of test writing, the test writing data are selectively output and supplied to the LD driver 10.

In addition to the above-mentioned functions and process control described later, the controller 8 controls the apparatus by sending to and receiving from a host computer (not shown) recording/reproducing information and performing command communications.

Figure 4:
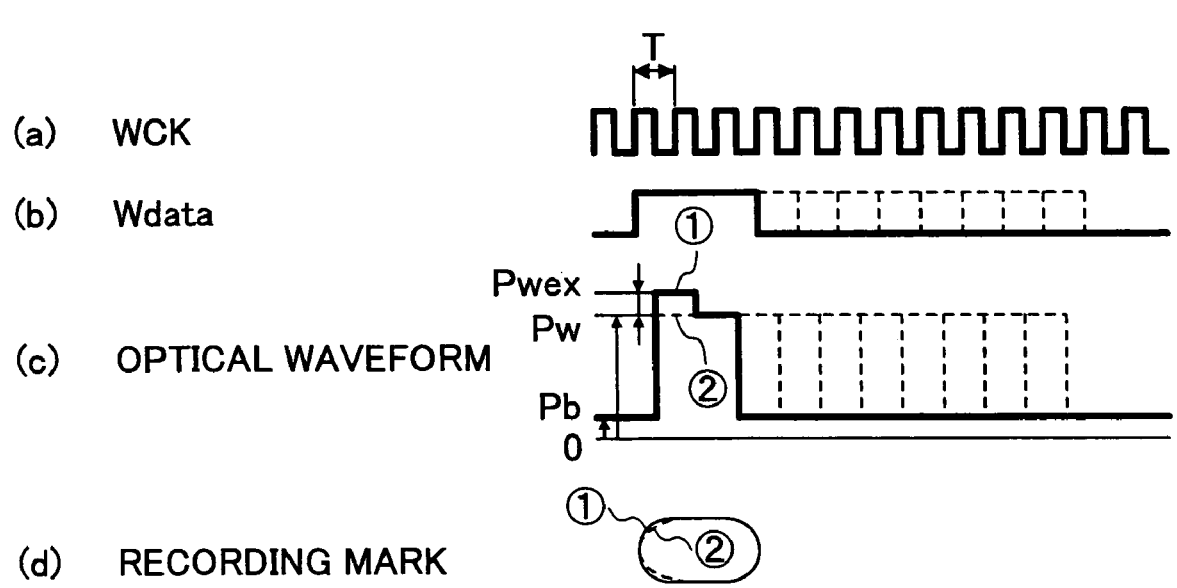
FIG. 4 is a waveform chart showing emission waveforms.

FIG. 4 shows an emission waveform of the light source LD in a case where a recordable recording medium of the dye system type, such as a CD-R, is assumed as the recording medium 1. FIG. 4(a) represents the recording clock WCK, FIG. 4(b) represents the recording data Wdata, and FIG. 4(c) represents the optical waveform at the time when the mark length of the recording data Wdata is 3T. Irradiation power is set to be a bottom power Pb, a recording power Pw, or the recording power Pw plus the extra recording power Pwex. Additionally, the broken lines in FIG. 4(b) and FIG. 4(C) represent the case where the mark length is 4t-11T. FIG. 4(d) is a recording mark formed with the optical waveform of FIG. 4(c): ① represents the case where the pulse of the extra recording power Pwex is applied to the front edge; and ② represents the case where the pulse is not applied thereto. By appropriately setting the extra recording power Pwex, the shape of a recording mark is uniformly formed as represented by ① in FIG. 4(d), and the recording mark edge position can be controlled with good accuracy.

Figure 5:
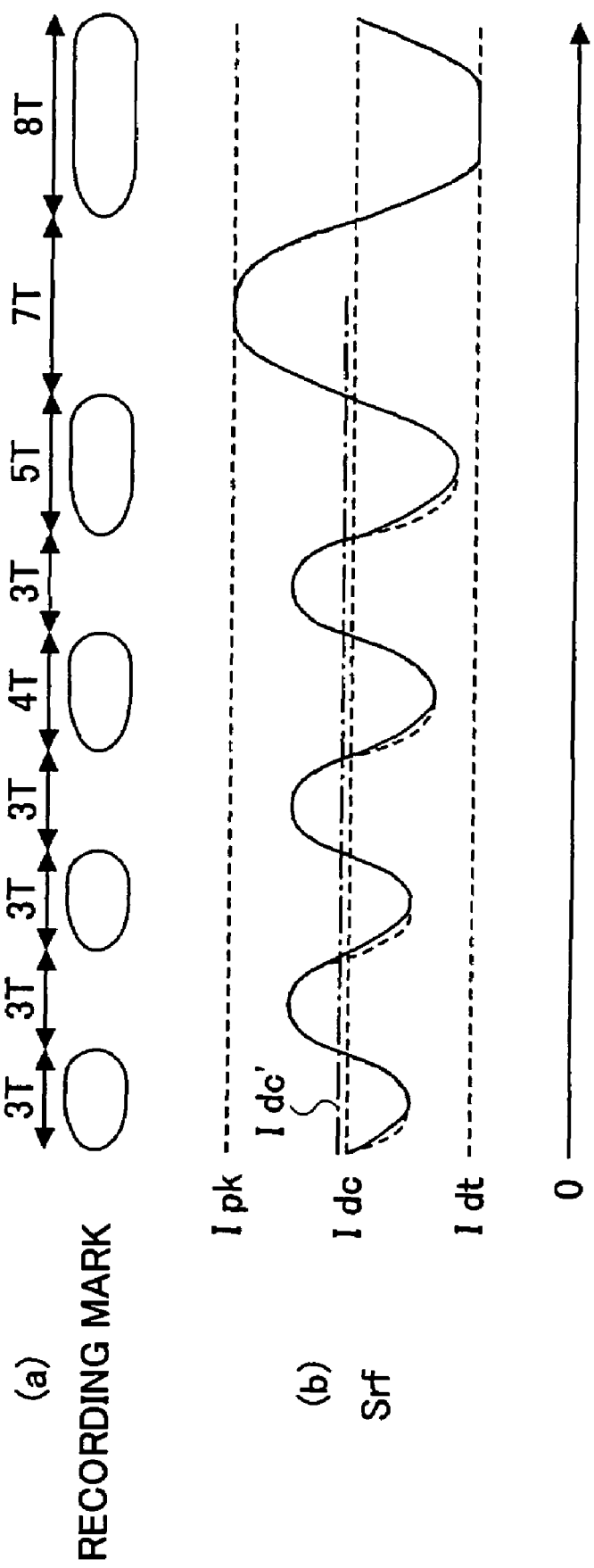
FIG. 5 is a diagram showing the characteristics of a recording mark and a reproduction signal Sfr then in the case where a recording power Pw is optimum and an extra recording power Pwex is not optimum.

FIG. 5(a) shows recording marks in the case where the recording power Pw is optimum and the extra recording power Pwex is not optimum (insufficient), and FIG. 5(b) shows the resulting reproduction signal Srf. Due to irregularity of the shapes of the front edges of the recording marks, the reproduction signal Srf is shifted from an ideal state (indicated by dotted line) to the state indicated by the continuous line, and the average value of the reproduction signal Srf varies to Idc' (one-dot chain line). On the other hand, the maximum value Ipk and the minimum value Ibt hardly vary.

Figure 6:
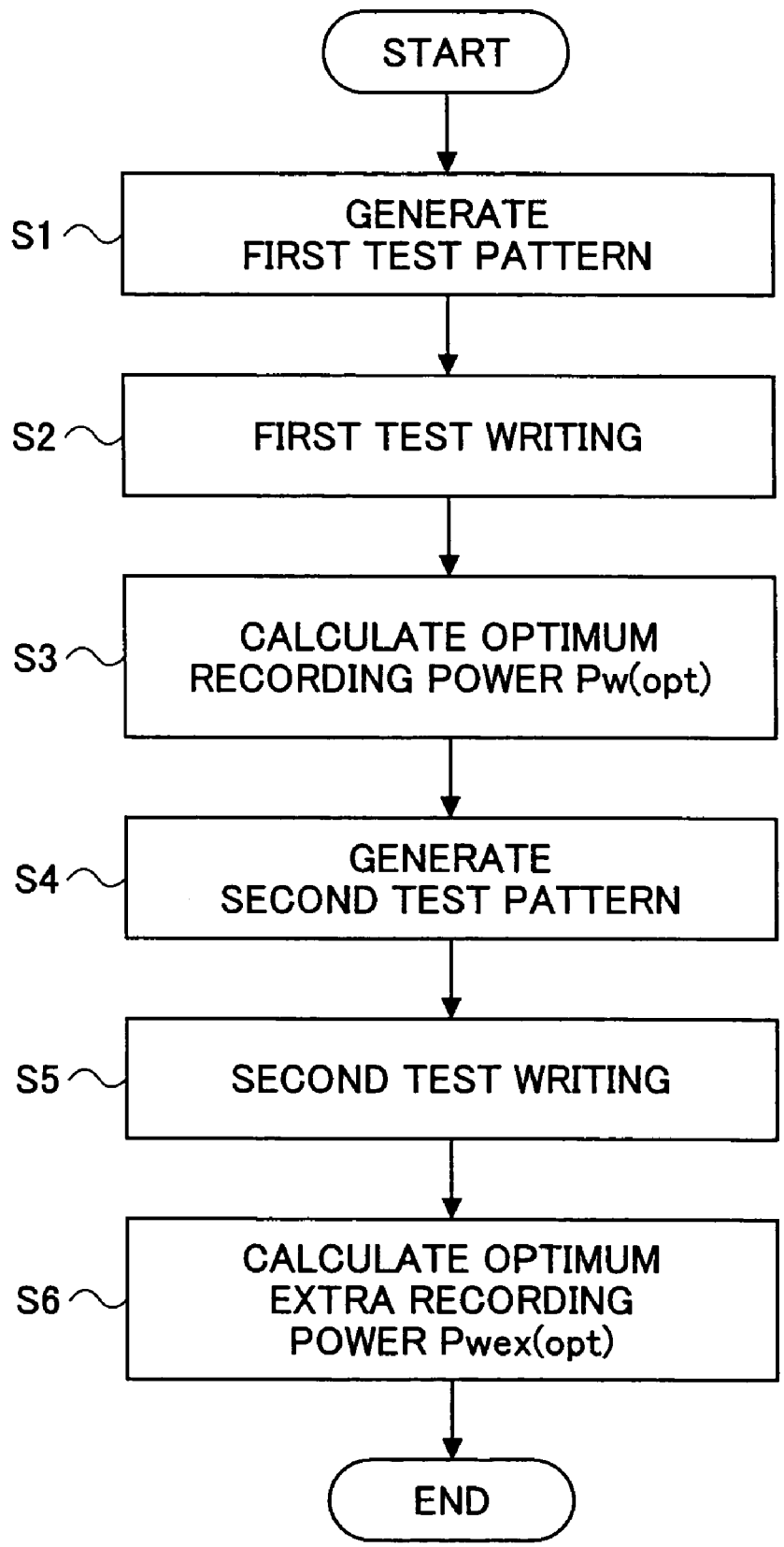
FIG. 6 is a schematic flowchart showing test writing process control.

Referring to the flowchart shown in FIG. 6, a description is given of exemplary process control of a recording method that is preferable for the recording medium 1 and is carried out under the above-mentioned conditions by the controller 8 formed by a microcomputer. FIG. 6 is a flowchart showing, among the control processes related to a recording operation, an algorithm for calculating an optimum recording power Pw(opt) and an optimum extra recording power Pwex(opt) accompanying a test writing process. Such calculation of the recording powers is performed as preparation for starting recording, and performed by a first test writing step or first test writing means for calculating the optimum recording power Pw(opt), and a second test writing step or second test writing means for calculating the optimum extra recording power Pwex(opt).

First, in the first test writing step (first test writing means), a first test pattern used in the first test writing step is generated in step S1. the first test pattern may be the recording data Wdata obtained by modulating normal data (for example, arbitrary data or fixed data supplied from the controller 8) by the encoder 9.

In step S2, the first test pattern is recorded in the test writing area while varying the recording power Pw for each sector. On this occasion, the extra recording power Pwex is varied while maintaining a predetermined proportional relationship with the recording power Pw (Pwex/Pw=constant). Alternatively, the extra recording power Pwex is maintained to be a predetermined value (Pwex=constant).

In step S3, the area subjected to test writing in step S2 is reproduced, and the power used for recording the sector in which the best reproduction signal Srf is obtained is calculated as the optimum recording power Pw(opt).

In order to evaluate the quality of the reproduction signal Srf, the following methods may be applied.

In a first method, as described above with reference to FIG. 3, the maximum value Ipk, the minimum value Ibt, and the average value (DC value) Idc of the reproduction signal Srf in each sector are detected. Then, the asymmetry β is determined by performing the calculation:

$$\beta=((Ipk-Idc)-(Idc-Ibt))/(Ipk-Ibt) \qquad (1)$$

for each sector.

Normally, the best reproduction signal is obtained when β=0. Thus, the power used for recording the sector in which β becomes closest to 0 may be determined to be the optimum recording power Pw(opt). Alternatively, an approximate expression of the recording power Pw and the asymmetry β may be calculated, and the recording power satisfying β=0 may be determined.

A second method uses as the index the rate of change γ of the degree of modulation m of the reproduction signal Srf with respect to the recording power Pw. Similar to the above-mentioned method, the maximum value Ipk and the minimum value Ibt of the reproduction signal Srf in each sector are detected. Then, the degree of modulation m is calculated by $$m=(Ipk-Ibt)/Ipk \qquad (2).$$

Subsequently, based on the calculated degree of modulation m and the recording power Pw then, the rate of change γ of the degree of modulation m with respect to the recording power Pw is calculated by $$\gamma=(dm/dPw)(Pw/m) \qquad (3).$$

The recording power Pt with which the rate of change γ becomes the predetermined value γt is obtained, and the optimum recording power Pw is obtained by multiplying the recording power Pt by the predetermined coefficient k. As for the predetermined value γt and the coefficient k, the values are determined in advance for each kind of the recording medium 1 and recording apparatus.

A description is given below of a more detailed calculation method. First, based on plural sets of data of the degree of modulation m and the recording power Pw detected by reproducing the test writing area, a quadratic approximate expression:

$$m=aPw2+bPw+c \text{ (a, b, c: constant)} \qquad (4)$$

is calculated. As for the approximation method, a general approximation method such as polynomial approximation may be used, and values obtained by a quadratic or higher approximation expression match well with measured values.

Based on the above-mentioned equation (3), dm/dPw=2a Pw+b. Hence, the following equation (5) is obtained.

$$Pw=\{-b(\gamma-1)\pm SQRT[b2(\gamma-1)2-4a(\gamma-2)c\gamma]\}/2a(\gamma-2) \qquad (5)$$

By performing these calculations and calculating a positive solution Pw+ of the equation (5), the optimum recording power Pw(opt) is determined.

In addition, these methods may be used in combination. Further, a jitter detector may be provided and the recording power with which the minimum jitter is obtained may be calculated.

Next, the second test writing step (second test writing means) of steps S4–S6 is performed.

Figure 7:
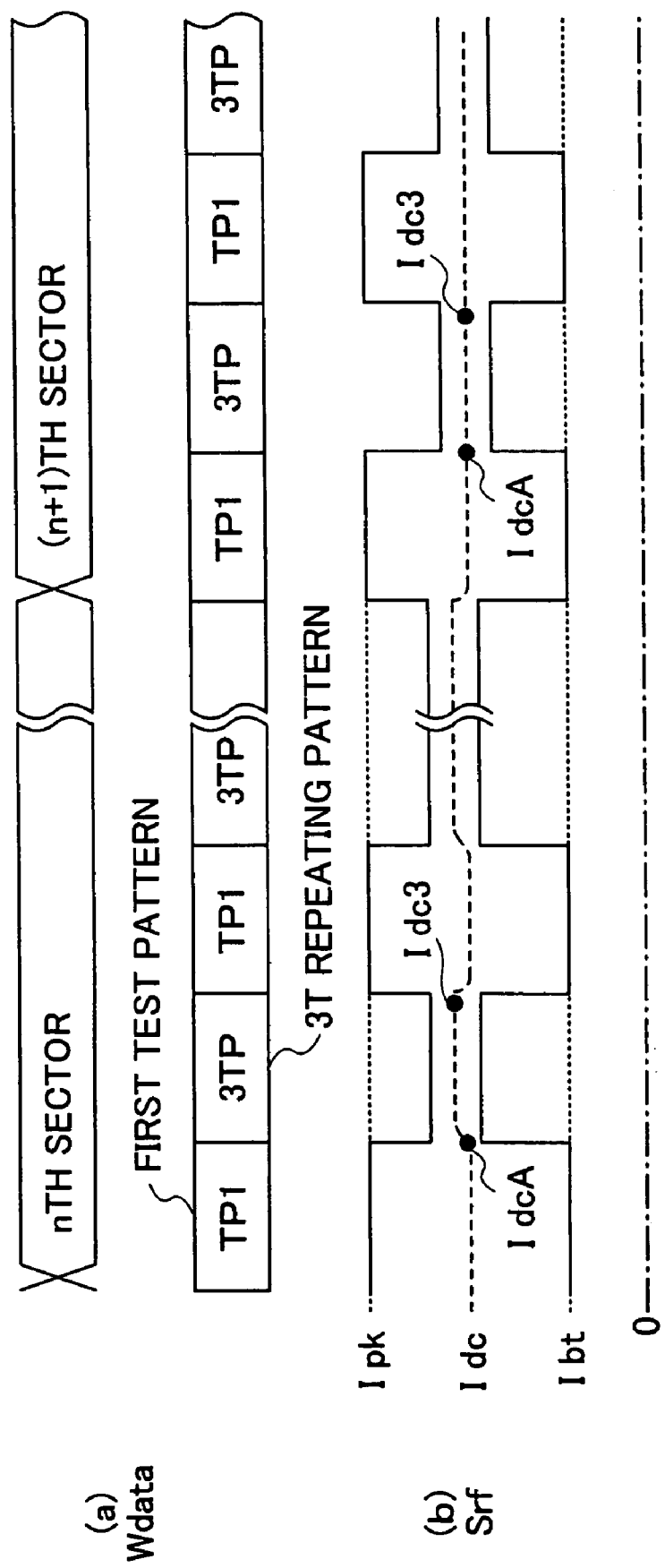
FIG. 7 is an explanatory diagram showing a test pattern.

In step S4, a second test pattern used in the second test writing step is generated. As shown in FIG. 7, the second test pattern is a pattern including: a first data string (the first test pattern=TP1) other than a 3T pattern, which is a specific pattern; and a second data string (3T repeating pattern=3TP) formed by repeating the 3T pattern, which is the specific pattern, in an alternating manner. Such second test pattern is supplied from the encoder 9 as the recording data Wdata.

In step S5, the optimum recording power Pw(opt) calculated in step S3 is set to the recording power, and the second test pattern is recorded in the test writing area while varying the extra recording power Pwex for each sector. On this occasion, it is preferable that the variable range of the extra recording power Pwex be centered on the value corresponding to the optimum recording power Pw(opt). In addition, in the case where, for example, the recording medium 1 is a rewritable medium, the test writing area may be the first test writing area used in step S2. Alternatively, the second test writing may be performed after erasing the data recorded on the test writing area. Further, the first test writing may be performed on the first half of the test writing area (for example, 1 ECC block) that can be used, and the second test writing may be performed on the latter half thereof. Here, however, since a recordable recording medium of the dye system type is assumed as the recording medium 1, the area subsequent to the test writing area of step S2 is used.

In step S6, the area subjected to test writing in step S5 is reproduced, and the power used for recording the sector in which the best reproduction signal Srf is obtained is determined to be the optimum extra recording power Pwex(opt). The reproduction signal Srf is obtained as shown in FIG. 7($b$).

In order to evaluate the quality of the reproduction signal Srf, as in the first method of step S3, the maximum value Ipk, the minimum value Ibt, and an average value (DC value) Idc3 of the 3T repeating area of the reproduction signal Srf in each sector are detected, and asymmetry β 3 is calculated by:

$$\beta 3 = [(Ipk - Idc3) - (Idc3 - Ibt)]/(Ipk - Ibt) \quad (6).$$

The power used for recording the sector in which β3 becomes closest to 0 may be selected as the optimum extra recording power Pwex(opt). Alternatively, an approximate expression of the extra recording power Pwex and the asymmetry β3 may be calculated, and the recording power satisfying β3=0 may be selected.

As mentioned above, if the extra recording power Pwex is not an appropriate value, the average value Idc of the reproduction signal Srf varies and the asymmetry β also varies. Normally, the shorter the mark length in a pattern is, the more significant such variation in the average value becomes. Hence, by using the 3T repeating pattern having the shortest mark length as the test pattern, detection in step S6 is facilitated and can be performed with good sensitivity, thereby improving the accuracy in calculation of the optimum extra recording power Pwex. Additionally, since the 3T repeating pattern is alternately repeated with normal data (the first test pattern), even if the amount of reflected light varies due to variation in reproduction power or variation in the reflectance of a recording medium, the maximum value Ipk and the minimum value Ibt vary in a similar ratio. Thus, it is possible to detect the asymmetry β3, which is calculated by the equation (6), without being affected by the above influence.

Further, when performing test writing, the first test pattern TP1 and the 3T repeating pattern 3TP are repeated in predetermined cycles in synchronization with sectors. Thus, by detecting the average value Idc3 in synchronization with sectors at the time of reproducing as well, it is possible to easily detect the average value Idc3. The repeating cycle of the first test pattern TP1 and the 3T repeating pattern 3TP may be set in consideration of an average value detection band of the reproduction signal Srf.

The test writing process ends by calculating the optimum recording power Pw(opt) and the optimum extra recording power Pwex(opt) in the aforementioned manner. At the time of normal information recording, by performing recording with the optimum recording power Pw(opt) and the optimum extra recording power Pwex(opt) thus obtained, it is possible to form the recording mark shapes and the mark positions with good accuracy. Thus, it is possible to perform recording with good accuracy.

Further, in step S3, the first test pattern may be a data string having the mark length of a predetermined length or longer (for example, the mark length of 4T or more). This is preferable especially when the asymmetry β is used for evaluation criteria of the reproduction signal Srf. In this case, variation in the average value level caused by the extra recording power Pwex not being an optimum value becomes minute, and it is possible to accurately calculate the optimum recording power Pw(opt).

In the above description, the case where recording is performed with the recording waveform as shown in FIG. 4 is described. However, the OPC method according to the present invention can be preferably and similarly applied to recording methods that perform recording with plural recording powers. For example, even if recording is performed with the recording waveforms as shown in FIG. 8($c$)–($e$) (in the optical waveform 1 of FIG. 8($c$), the pulses of the extra recording power Pwex are applied to the front and rear edges of a recording pulse; in the optical waveform 2 of FIG. 8($d$), the extra recording power Pwex is applied to the front and the last pulses of a multi-pulse; and in the optical waveform 3 of FIG. 8($e$), the extra recording power Pwex is applied to the latter half of the front pulse and the last pulse of a multi-pulse also using an erase power Pe), the optimum values of the recording power Pw and the extra recording power Pwex can be calculated in a similar manner.

What is claimed is:

1. An information recording method that records information by forming recording marks by guiding from a light source to a recording medium an optical beam modulated based on recording information, said information recording method comprising:

a first test writing step of performing test writing of predetermined first test data on a test writing area of the recording medium while varying an applied recording power in stages, and calculating an optimum recording power from a reproduction signal of the test-written first test data; and a second test writing step of setting the recording power to the optimum recording power and performing test writing of predetermined second test data on the test writing area of the recording medium while varying in stages an extra recording power level applied in a part of a time period in which the optimum recording power is applied, and calculating an optimum extra recording power level from a reproduction signal of the test-written second test data, wherein information is recorded by using the calculated optimum recording power and the calculated optimum extra recording power level.

2. The information recording method as claimed in claim 1, wherein the predetermined first test data are a data string of the recording information other than a predetermined specific pattern.

3. The information recording method as claimed in claim 1, wherein the predetermined second test data are a data string including a first data string and a second data string in an alternating manner, the first data string is formed by the first test data, and a predetermined specific pattern is repeated in the second data string.

4. The information recording method as claimed in claim 1, wherein the optimum recording power in the first test writing step is calculated from one of a degree of modulation of the reproduction signal of the area subjected to the test writing of the first test data and a rate of change of the degree of modulation, and wherein the optimum extra recording power level in the second test writing step is calculated from asymmetry of the reproduction signal of the area subjected to the test writing of the second test data.

5. The information recording method as claimed in claim 3, wherein the optimum extra recording power level in the second test writing step is calculated from a ratio of a positive peak value and a negative peak value of the reproduction signal of the first data string with respect to an average value level of the reproduction signal of the second data string of the area subjected to the test writing of the second test data.

6. The information recording method as claimed in claim 2, wherein the predetermined specific pattern is a minimum mark length of the recording information.

7. An information recording apparatus that records information by forming recording marks by guiding from a light source to a recording medium an optical beam modulated based on recording information, said information recording apparatus comprising:

a first test writing part that performs test writing of predetermined first test data on a test writing area of the recording medium while varying an applied recording power in stages, and calculates an optimum recording power from a reproduction signal of the test-written first test data; and a second test writing part that sets the recording power to the optimum recording power and performs test writing of predetermined second test data on the test writing area of the recording medium while varying in stages an extra recording power level applied in a part of a time period in which the optimum recording power is applied, and calculates an optimum extra recording power level from a reproduction signal of the test-written second test data, wherein information is recorded by using the calculated optimum recording power and the calculated optimum extra recording power level.

8. The information recording apparatus as claimed in claim 7, wherein the predetermined first test data are a data string of the recording information other than a predetermined specific pattern.

9. The information recording apparatus as claimed in claim 7, wherein the predetermined second test data are a data string including a first data string and a second data string in an alternating manner, the first data string is formed by the first test data, and a predetermined specific pattern is repeated in the second data string.

10. The information recording apparatus as claimed in claim 7, wherein the first test writing part calculates the optimum recording power from one of a degree of modulation of the reproduction signal of the area subjected to the test writing of the first test data and a rate of change of the degree of modulation, and wherein the second test writing part calculates the optimum extra recording power level from asymmetry of the reproduction signal of the area subjected to the test writing of the second test data.

11. The information recording apparatus as claimed in claim 9, wherein the second test writing part calculates the optimum extra recording power level from a ratio of a positive peak value and a negative peak value of the reproduction signal of the first data string with respect to an average value level of the reproduction signal of the second data string of the area subjected to the test writing of the second test data.

12. The information recording apparatus as claimed in claim 8, wherein the predetermined specific pattern is a minimum mark length of the recording information.

13. The information recording apparatus as claimed in claim 9, wherein the predetermined specific pattern is a minimum mark length of the recording information.

14. The information recording apparatus as claimed in claim 10, wherein the predetermined specific pattern is a minimum mark length of the recording information.

15. The information recording apparatus as claimed in claim 11, wherein the predetermined specific pattern is a minimum mark length of the recording information.

* * * * *